United States Patent [19]

Peters

[11] Patent Number: 5,285,686
[45] Date of Patent: Feb. 15, 1994

[54] COLIOLIS RATE SENSOR USING TUNNEL-EFFECT DISPLACEMENT SENSOR

[75] Inventor: Rex B. Peters, Woodinville, Wash.

[73] Assignee: Sundstrand Data Control, Inc., Redmond, Wash.

[21] Appl. No.: 62,281

[22] Filed: May 17, 1993

Related U.S. Application Data

[63] Continuation of Ser. No. 720,981, Jun. 25, 1991, abandoned.

[51] Int. Cl.$^5$ ............................................. G01P 9/04
[52] U.S. Cl. ..................................................... 73/505
[58] Field of Search ................. 73/505, 517 R, 517 B, 73/517 AV, 862.625, 862.59

[56] References Cited

U.S. PATENT DOCUMENTS

| | | | |
|---|---|---|---|
| 4,445,376 | 5/1984 | Merhav | 73/510 |
| 4,522,062 | 6/1985 | Peters | 73/505 |
| 4,638,669 | 1/1987 | Chou | 73/517 R |
| 4,654,663 | 3/1987 | Alsenz et al. | 73/505 |
| 4,712,426 | 12/1987 | Peters | 73/505 |
| 4,744,249 | 5/1988 | Stewart | 73/505 |
| 4,899,587 | 2/1990 | Staudte | 73/505 |
| 4,912,990 | 4/0390 | Norling | 73/862.59 |
| 5,048,339 | 9/1991 | Neuhaus | 73/515 |

OTHER PUBLICATIONS

W. J. Kaiser et al., "Tunnel-Effect Displacement Sensor", *NASA Tech Brief* vol. 13, No. 9, Item #155, from JPL Invention Report NPO-17362/6677 (Sep., 1989).

R. H. Halsing, II, "Single Coriolis Inertial Rate and Acceleration Sensor," *Journal of The Institute of Navigation*, vol. 35, No. 3, pp. 347–359 (Fall 1988).

S. B. Waltman et al., "An Electron Tunneling Sensor," *Sensors and Actuators*, 19 (1989) 201–210.

*Primary Examiner*—John E. Chapman
*Attorney, Agent, or Firm*—McAndrews, Held & Malloy, Ltd.

[57] ABSTRACT

A rate detection system (10) uses a balanced resonant sensor (12) having first and second tines (14,16) interconnected with a mounting pad (20). A sensing circuit (50) including a tunnel effect displacement sensor (38) having a first probe (40) connected to the mounting pad (20) and a second probe (42) connected to a reference pad (32) detects an output signal having a Coriolis component. A feedback circuit provides a compensation signal to the balanced resonant sensor (12).

11 Claims, 3 Drawing Sheets

COLIOLIS RATE SENSOR USING TUNNEL-EFFECT DISPLACEMENT SENSOR

This is a continuation of U.S. patent application Ser. No. 07/720,981, filed Jun. 25, 1991, abandoned.

FIELD OF THE INVENTION

The present invention relates to detection systems and devices used in navigational and inertial guidance systems and in particular, to a detection system utilizing a tunnel effect displacement sensing arrangement in a balanced resonant sensor for determining angular rate of change of rotation.

BACKGROUND OF THE INVENTION

The angular rate of rotation of a moving body about a rate axis is an essential input to a inertial navigation system. The angular rate of rotation about a given coordinate axis may be measured by vibrating an accelerometer along an axis normal to sensitive axis of the accelerometer and normal to the axis about which rotation is measured. From these data, the attitude of a vehicle or craft may be measured.

For example, an X, Y and Z coordinate system may be fixed in a moving body whose angular rate of change is to be measured. An accelerometer fixed in the body has its sensitive axis aligned along the Z axis. If the angular rotation vector of the body includes a component along the X axis, then periodic motion of the accelerometer along the Y axis will result in a periodic Coriolis acceleration acting in the Z direction. The magnitude of the Coriolis acceleration is proportional to the rotation rate about the X axis.

The accelerometer senses the Coriolis acceleration and generates an output signal. The output signal may include a slowly changing component which represents the linear acceleration of the body along the Z axis and a periodic component that represents the rotation of the body about the X axis. The accelerometer output can be processed, along with output signals of accelerometers having their sensitive axes in the X and Y directions and that are moved along the Z and X axes, respectively, to yield angular rate about the X, Y and Z axes, as described in U.S. Pat. No. 4,590,801.

Known types of accelerometers typically produce an output signal having a frequency related to the sensed acceleration. An example of such a frequency output accelerometer is a vibrating beam accelerometer. In this arrangement, a proof mass is supported by a flexure hinge or the like, and by a vibrating beam force sensing element that extends along the sensitive axis of the accelerometer. The force sensing element is coupled to a drive circuit that provides a signal for vibrating the force sensing element at its resonant frequency. An acceleration along the sensitive axis causes the proof mass to exert a tension or compression force on the force sensing element. A tension force on the force sensing element causes its resonant frequency to increase, while a compression force on the force sensing element causes its resonant frequency to decrease. The force sensing element can therefore be operated as a force to frequency converter in that frequency modulates an acceleration signal onto a carrier signal, the carrier signal being the zero acceleration resonant frequency of the force sensing element.

Other types of Coriolis rate sensors employ the use of a vibrating mechanism which is rotated in inertial space. Such an arrangement may be provided with a tuning fork having a pair of tines disposed in parallel relation. The tines are electromechanically excited in a plane at a predetermined frequency. The tines are interconnected by an output shaft, from which an output signal may be derived. The output signal is representative of the input angular rate of motion to which the body is subjected, which causes a deflection normal to the direction of vibration.

The output signal generated in these rate sensors may be converted to a digital signal, and may thereafter be conveniently processed in an inertial navigation system. The output signal is recovered by synchronous demodulation of signals produced by the Coriolis forces which are generated when a force sensing element is rotated in inertial space, as described, for example in U.S. Pat. No. 4,712,426.

Coriolis forces, however, are typically very small in many applications. Accordingly, very sensitive sensing devices with low noise characteristics must be utilized for accurate detection. Known solutions employ the use of piezoelectric materials. Such materials have been used, for example, in gravity wave detectors which are capable of detecting strains of $10^{-15}$. A practical difficulty, however, arises as the piezoelectric materials are fabricated in very small arrangements. A principal disadvantage of the materials used in known devices is that signal energy decreases dramatically with diminished size. The signal-to-noise ratio is therefore relatively poor.

Another disadvantage of known piezoelectric detection devices lies in the techniques used to fabricate such devices. Frequently, sensors are fabricated utilizing silicon micromachined structures. Piezoelectric materials, especially those with desirable sensing properties such as quartz or lead zirconate-titanate, are not easily combined with silicon technology. Accordingly, difficulties are frequently encountered in manufacture and implementation of sensitive detection devices.

SUMMARY OF THE INVENTION

The present invention overcomes the problems of prior art angular rate detection systems and devices with a Coriolis rate detection system that uses a tunnel effect displacement sensor to detect Coriolis forces generated in a resonant sensor. The tunnel effect sensing arrangement according to the invention is capable of detecting Coriolis forces which are inherently very small. The present invention is also well suited for scaling to very small sizes. In addition, the use of prior art piezoelectric sensing elements and the difficulties of manufacture associated therewith is eliminated inasmuch as tunnel effect sensing probes may be produced by silicon etching. Thus, the present invention is easily adaptable with silicon technology.

A detection system according to the present invention comprises a resonant sensor having first and second vibratory tines disposed in parallel relation about a longitudinal sensing axis. A mounting pad element disposed about the sensing axis interconnects the tines. The first and second tines have their sensitive axes parallel to the longitudinal sensing axis that in turn is perpendicular to the rate axis. The tines are driven into oscillation at a predetermined frequency. Angular movement of the system produces Coriolis forces which mechanically oscillate the resonant sensor for vibrating the mounting pad element about the sensing axis. The mounting pad oscillates at the drive frequency of its in-plane electrical/mechanical oscillation with the amplitude being dependent on the angular rate.

A tunnel effect displacement sensor includes a first sensing probe associated with the mounting pad element and a second sensing probe associated with a reference pad. The first and second sensing probes are maintained at a preselected average spacing from each other. A sensing circuit connected to the probes maintains a potential therebetween, wherein a change in the separation of the probes modulates the voltage. The sensing circuit generates a sensing signal indicative of sensed voltage. The sensing signal may thereafter be supplied to a band-pass filter circuit for recovering a Coriolis signal component, which may be conveniently demodulated and processed. The output signal is representative of the input angular rate of motion to which the system is subjected.

A feedback circuit also receives the sensing signal and supplies a compensation signal to the resonant sensor. The compensation signal is supplied to a torquer mechanism arranged to maintain the predetermined distance between the tunnel effect sensing probes. The feedback circuit provides an error torque representative of low frequency signals generated by the sensing circuit. In this way, shock and vibrational effects are effectively cancelled.

In another embodiment, a pair of tunnel-effect displacement sensors are arranged opposite the longitudinal sensing axis in a push-pull arrangement in connection with a balanced resonant sensor. The first and second tunnel-effect sensors produce first and second differential output signals. This arrangement may be easily integrated in a system having a pulse generator for supplying a periodic movement signal to the balanced resonant sensor. A pair of feedback circuits provide compensation to the balanced resonant sensor. The output signals are thereafter converted to digital signals and provided to a processor.

DESCRIPTION OF THE PREFERRED EMBODIMENT

This invention relates to devices, systems and methods for detecting Coriolis forces in an angular rate detection system. The invention uses a balanced resonant sensor which responds to the application of angular rate to produce a Coriolis force component. A sensing circuit including a tunnel-effect displacement sensor having first and second sensing probes detects the oscillation of the balanced resonant sensor and generates a signal having a component indicative of angular rate. A feedback circuit provides a compensation signal to the balanced resonant sensor to maintain a preselected average spacing between the sensing probes. The detection system according to this invention is suitable for use in an inertial navigation system, and in particular for use in applications where the types of forces to be sampled are typically quite small and the need for very sensitive devices with low noise characteristics exists.

Figure 1:
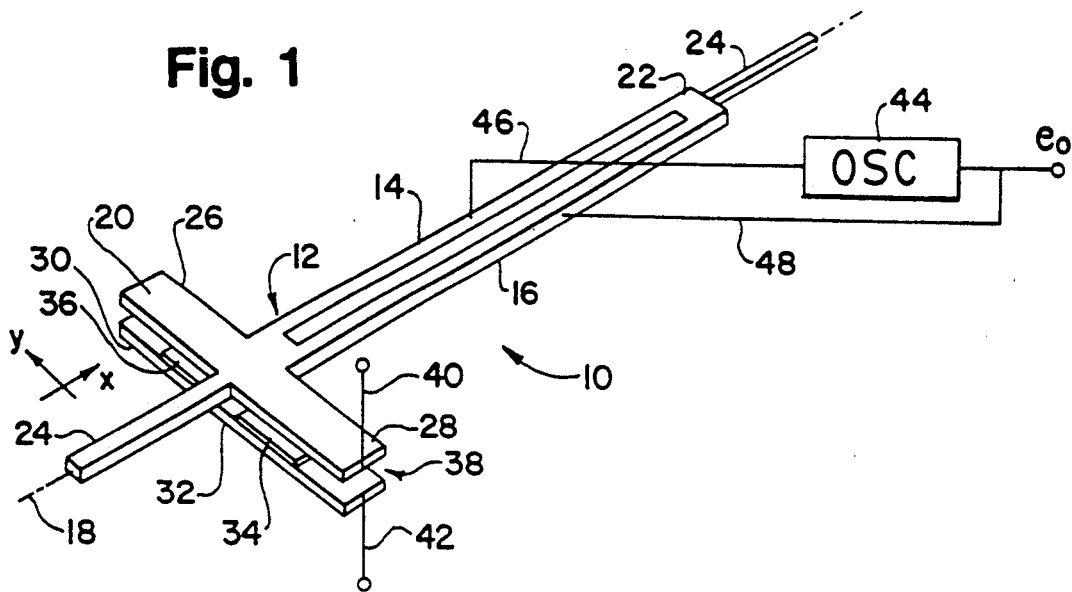
FIG. 1 is a perspective view of a balanced resonant sensor with a tunnel effect displacement sensor according to the present invention.

FIG. 1 shows a perspective view of a balanced resonant sensor 12 used in the detection system 10 of the present invention. The resonant sensor 12 is a double-ended vibrational sensing element, sometimes known to those skilled in the art as a Double-Ended Tuning Fork (DETF). The balanced resonant sensor 12 includes first and second vibratory tines 14 and 16 disposed in parallel relation in an x-y plane about a longitudinal sensing axis 18. These tines 14 and 16 represent the input or drive tines. The first and second tines 14 and 16 are driven into resonance within the x-y plane, as discussed in greater detail below, and are preferably fabricated from a quartz wafer or other suitable piezoelectric material.

The first and second tines 14 and 16 are interconnected at one end with a mounting pad 20. The tines 14 and 16 form a junction 22 at the other end. A soft suspension shaft 24 disposed along the longitudinal axis 18 is rigidly connected to the junction 22 and mounting pad 20. The suspension shaft 24 is also rigidly connected to the body undergoing angular rate of change to be measured. The mounting pad 20 includes a pair of lateral elements 26 and 28 which extend substantially symmetrically about the longitudinal axis 18 in the plane of the first and second tines 14 and 16. FIG. 1 also illustrates a reference mounting pad 30, which is rigidly connected to the moving body. A torquer mechanism 32 provides mechanical force to the mounting pad 20 upon the receipt of voltage signals at a pair of electrodes 34 and 36. The torquer mechanism 32 provides a compensating torque in response to low frequency signals generated by vibration, thermal drift, linear acceleration and other effects to maintain the mounting pad 20 at a predetermined average distance from the reference mounting pad 30, as described in greater detail below.

Figure 2:
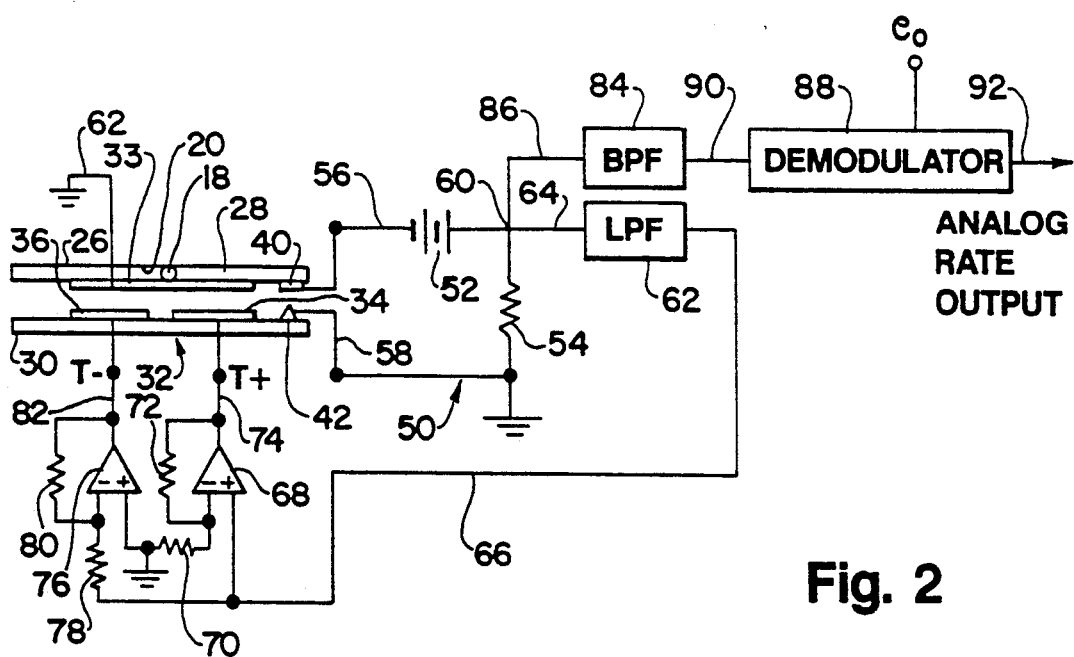
FIG. 2 is a simplified electrical schematic diagram showing the electrical connection of the sensor of FIG. 1.

FIGS. 1 and 2 also show the placement of a tunnel-effect displacement sensor 38 which, for example, may be of the type described in an article entitled "Tunnel-Effect Displacement Sensor," *NASA Tech Brief* Vol. 13, No. 9 (Sept. 1989), the subject matter of which is incorporated herein by reference. The tunnel effect displacement sensor 38 includes a first sensing probe 40 which is mounted to the lateral portion 24 of the mounting pad 20. A second sensing probe 42 is mounted to the reference mounting pad 30 and maintained at a predetermined spacing from the first sensing probe 40. The sensing probes are preferably fabricated of silicon and may be formed by etching techniques which will be understood by those skilled in the art. As explained in further detail below, a potential is maintained between the first and second probes.

When the first and second tines 14 and 16 resonate in the plane of the sensor structure 12, the tines apply a vibrational force to the mounting pad element 20, which in turn vibrates the lateral mounting pad element 28 when angular rate is present about the longitudinal axis 18. In the presence of a changing angular rate about the longitudinal input axis 18, the first and second tines 14 and 16 produce an oscillating torque which vibrates the lateral mounting pad element 28 so that the resulting movement has a frequency spectrum including equal to the sum and difference between the resonant frequency and the frequency of change of angular rate. Of course, any shock, vibrational or other effects may produce an oscillating torque as well. The change in the spacing between the first and second sensing probes 40 and 42 modulates the voltage therebetween.

The present invention is suitable for use with various resonator arrangements and the placement of the tunnel-effect sensor 38 need not necessarily be located as shown in FIG. 1. However, the preferred placement of a tunnel-effect displacement sensor which is sensitive to $10^{-5}$ Angstroms per $\sqrt{Hz}$ is chosen for a balanced resonant sensor 12 such as a 60 gram force AC-CELEREX DETF having its vibratory tines 14 and 16 joined at the junction 22 with negligible added torque. The tunnel-effect displacement sensor 38 is disposed at the distal end of the mounting pad lateral portion 28. In this preferred arrangement, a peak displacement of the distal end of the lateral mounting pad element 28 per one radian/second angular rate is approximately 2.7 Angstroms per radian per second. Accordingly, when a tunnel-effect displacement sensor sensitive to $10^{-5}$ Angstroms per $\sqrt{Hz}$ is utilized to measure displacement within a bandwidth of $\pm 200$ Hz and centered at a crystal frequency of 35 kHz, a performance of 15 degrees per Hour RMS for the sensing arrangement may be achieved. Integrated to indicated angular displacement, such performance is equivalent to a random walk of only $0.005°/\sqrt{hour}$, which is more than sufficient for inertial navigation.

FIG. 1 also shows an oscillator circuit 44 of the type well known to those skilled in the art having a first lead 46 coupled to the first tine 14 of the resonant sensor 12. The oscillator circuit 44 has an output lead 48 coupled to the second tine 16. The oscillator circuit 44 supplies a signal $e_o$ to mechanically oscillate the resonant sensor 12 at the predetermined frequency of oscillation, which by way of example, may be 35 kHz.

FIG. 2 shows a schematic diagram of the tunnel effect sensor utilized in the present invention in greater detail. The tunnel position sensor 38 operates with a first sensing probe or electrode 40, a second sensing probe or electrode 42, and a torquer mechanism 32 to adjust the separation between the mounting pad 20 and the reference pad 30 and between the first and second sensing probes 40 and 42. In the preferred embodiment, the first sensing probe 40 has a flat tunneling electrode surface. The second sensing probe 42 has a conical tip electrode surface. A sensing circuit 50 provides a potential between the sensing probes 40 and 42. The sensing circuit 50 includes a constant voltage source 52 coupled with a resistor 54 for applying a voltage between the first and second sensing probes via the lines 56 and 58.

As noted above, the resonant sensor 12 is a driven resonator having a mode of vibration in a symmetric bending mode with the first and second tines 14 and 16 moving 180 degrees out of phase in their common plane. When the sensing element 12 is subject to an angular rate about the longitudinal sensing axis 18, a cyclical deflection of the tines 14 and 16 at right angles to the driven vibration of the tines results. As explained in greater detail below, the AC component of the signal indicative of angular rate is thereafter detected.

The tunneling effect occurs when a small potential is applied across the first and second sensing probes 40 and 42 and the electrodes are drawn sufficiently close to each other. In this mode of operation, the wave functions of the electrodes overlap so that electrons from the first electrode 40 may reach the second electrode 42. The electron penetration provides a tunneling current therebetween. The resulting tunneling current is extremely sensitive to the separation to the first and second sensing probes 40 and 42. Accordingly, any movement or vibration of the electrode results in a corresponding change in the magnitude of the tunnelling current. The change in the magnitude of tunneling current develops an open loop voltage signal at the node 60.

FIG. 2 also shows the mechanical placement of the torquer mechanism 32 in greater detail. As shown in FIG. 2, at least a portion of the mounting pad 20 includes an electrically conductive portion 33 connected to electrical ground via a line 62. A pair of opposed electrically conductive portions 34 and 36 are connected to the reference pad 30 and are opposite the longitudinal axis 18. The torquer mechanism 32 is a differential electrostatic torquer that provides linear force to the mounting pad 20 and to the balanced resonant sensor 12 to provide compensation for low frequency vibrations detected by the tunnel-effect sensor. As an example, the body to be measured frequently undergoes shock, vibrational or temperature-related alterations. The voltage signal developed at the node 60 is therefore a composite signal including a high frequency Coriolis component and a lower frequency component generated as a result of undesired effects. Accordingly, the voltage signal developed at the node 60 is supplied to a low-pass filter circuit 62 via a line 64 to provide a low frequency compensation signal of a limited bandwidth.

The compensation signal is thereafter supplied to the torquer mechanism 32. This maintains the correct effective spacing of the tunnel effect sensor electrodes under vibration, temperature variation, and other variations which are supplied to the sensing system 10. The low-pass filter circuit 62 provides a low frequency compensation signal on a line 66 to the non-inverting terminal of a first operational amplifier 68. The first amplifier has its inverting terminal connected to ground via a resistor 70. A feedback resistor 72 is coupled between the inverting terminal and the output of the first amplifier 68. The output T+ of the first amplifier 68 is supplied to the first conductive portion 34 via a line 74. In this way, an electrostatic force proportional to the low frequency signal detected by the sensor 12 is supplied as an error torque to the sensor 12.

In a similar fashion, the compensation signal is provided to the non-inverting terminal of a second operational amplifier 76 through a resistor 78. The second amplifier 76 provides a signal T− to the second conductive portion 36 via a line 82 which is 180 degrees out of phase with the signal supplied to the first conductive portion 34. Accordingly, an error torque is provided to the resonant sensor 12.

The voltage signal generated by the tunnel effect displacement sensing electrodes is also supplied to a band pass filter circuit 84 via the line 86. This open loop signal is centered at the crystal frequency of the electronic oscillator circuit 44. For example, the open loop signal may be centered on a frequency of about 35 kilohertz within a one kilohertz band.

The signal is thereafter applied to a demodulator circuit 88 on a line 90. In this regard, the demodulator circuit 88 also receives the output signal $e_o$ from the oscillator circuit 44 as will be understood by those skilled in the art. In this way, an analog rate output signal representative of Coriolis forces is proved at a line 92. The actual Coriolis signal is open loop and nonlinear, but is sensitive over a limited range of several Angstroms. Of course, a digital signal may also be easily obtained, as is described in connection with FIGS. 3 and 4.

Figure 3:
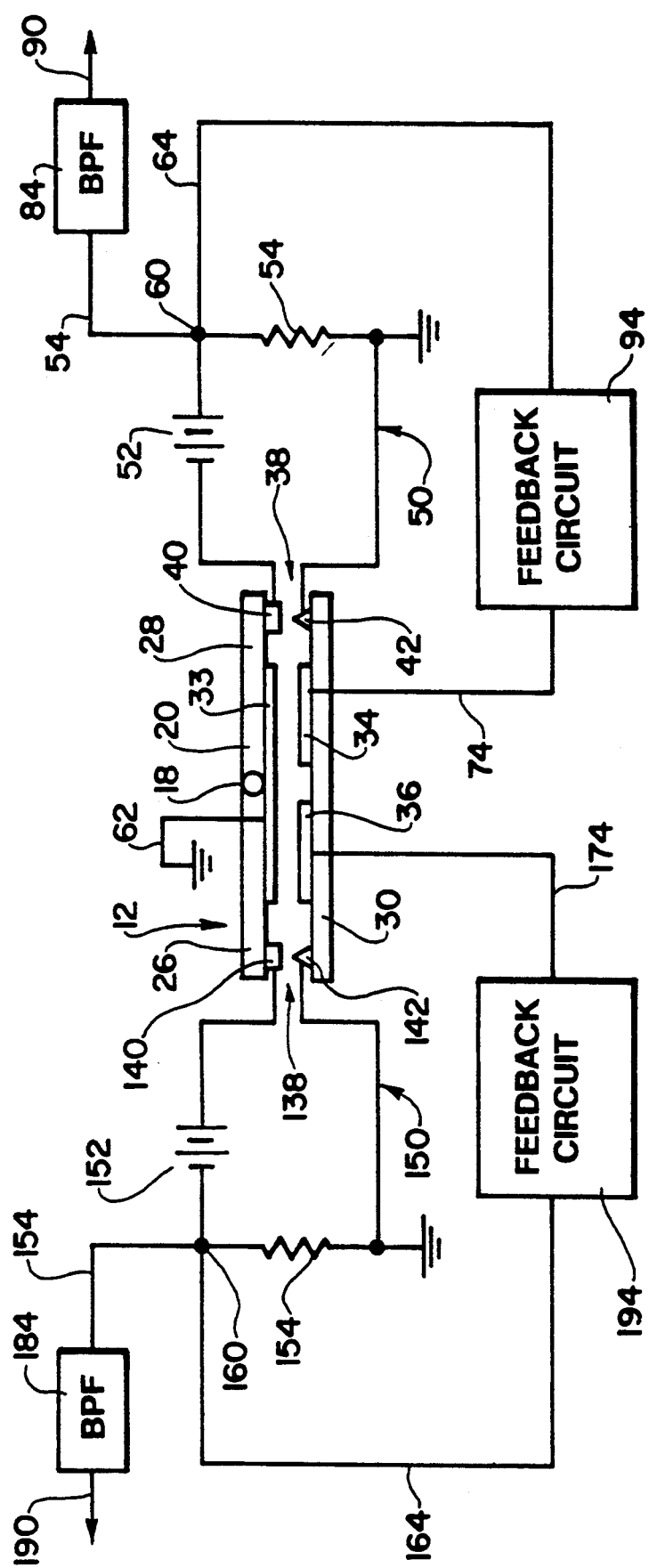
FIG. 3 is a simplified diagram of a balanced resonant sensor with a pair of opposed tunnel effect displacement sensors in accordance with another embodiment of the present invention.

FIG. 3 shows first and second tunnel effect sensors 38 and 138 which are mounted in a push-pull arrangement opposite the longitudinal sensing axis 18. The configuration and operation of the first tunnel effect sensor 38 is essentially the same as shown in FIGS. 1 and 2. A sensing circuit 50 including the constant voltage source 52 and resistor 54 maintain a potential across the tunnel-effect electrodes 40 and 42. One of the electrodes 40 is mounted to the lateral portion 28 of the mounting pad 20, with the other electrode 42 mounted to the reference pad 30. An angular rate component applied about the longitudinal axis develops a composite signal including a Coriolis component and a low frequency component representative of unwanted motion effects at the node 60. The composite signal is supplied to a feedback circuit 94 via the line 64. The feedback circuit 94 includes a low-pass filter circuit for discriminating low frequency portions of the composite signal, as shown in FIG. 2. The feedback circuit 94 supplies a compensation signal to the electrostatic pad 34 on a line 74 to provide an error torque to the balanced resonant sensor 12. The composite signal developed at the node 60 is also supplied to a band-pass filter circuit 84 for obtaining an open loop Coriolis output signal at the line 90.

In a similar fashion, the second tunnel-effect sensor 138 includes first and second tunnel-effect electrodes 140 and 142. The first electrode 142 is mounted to the lateral portion 26 of the mounting pad 20, opposite both the longitudinal sensing axis 18 and the first tunnel-effect sensor 38. The second electrode 142 is mounted to the reference pad 30. As with the first tunnel-effect sensor 38, a sensing circuit 150 including a voltage source 152 and a resistor 154 are connected in circuit with the tunnel-effect electrodes 140 and 142 to provide a potential therebetween.

An angular rate component about the longitudinal axis also vibrates the lateral portion 26 to modulate the voltage between the electrodes 140 and 142. This develops a composite signal at the node 160. The sensed composite signal is supplied via a line 164 to a second feedback circuit 194, which includes a low-pass filter circuit for separating the low frequency portion of the sensed composite signal. The feedback circuit 194 supplies a compensation signal to the electrostatic pad 36 on a line 174 to provide an error torque to the balanced resonant sensor 12. The error torques provided by the feedback circuits 94 and 194 cooperate antiphase so that acceleration forces or thermal drifts which would otherwise alter the common mode spacing of the pairs of electrodes 40, 42 and 140, 142 are cancelled by the torquer mechanisms 34, 36 adding in-phase. The composite signal detected by the second tunnel-effect sensor 138 is also supplied to a band pass filter circuit 184 on a line 154 to obtain an open loop Coriolis output signal at a line 190.

Figure 4:
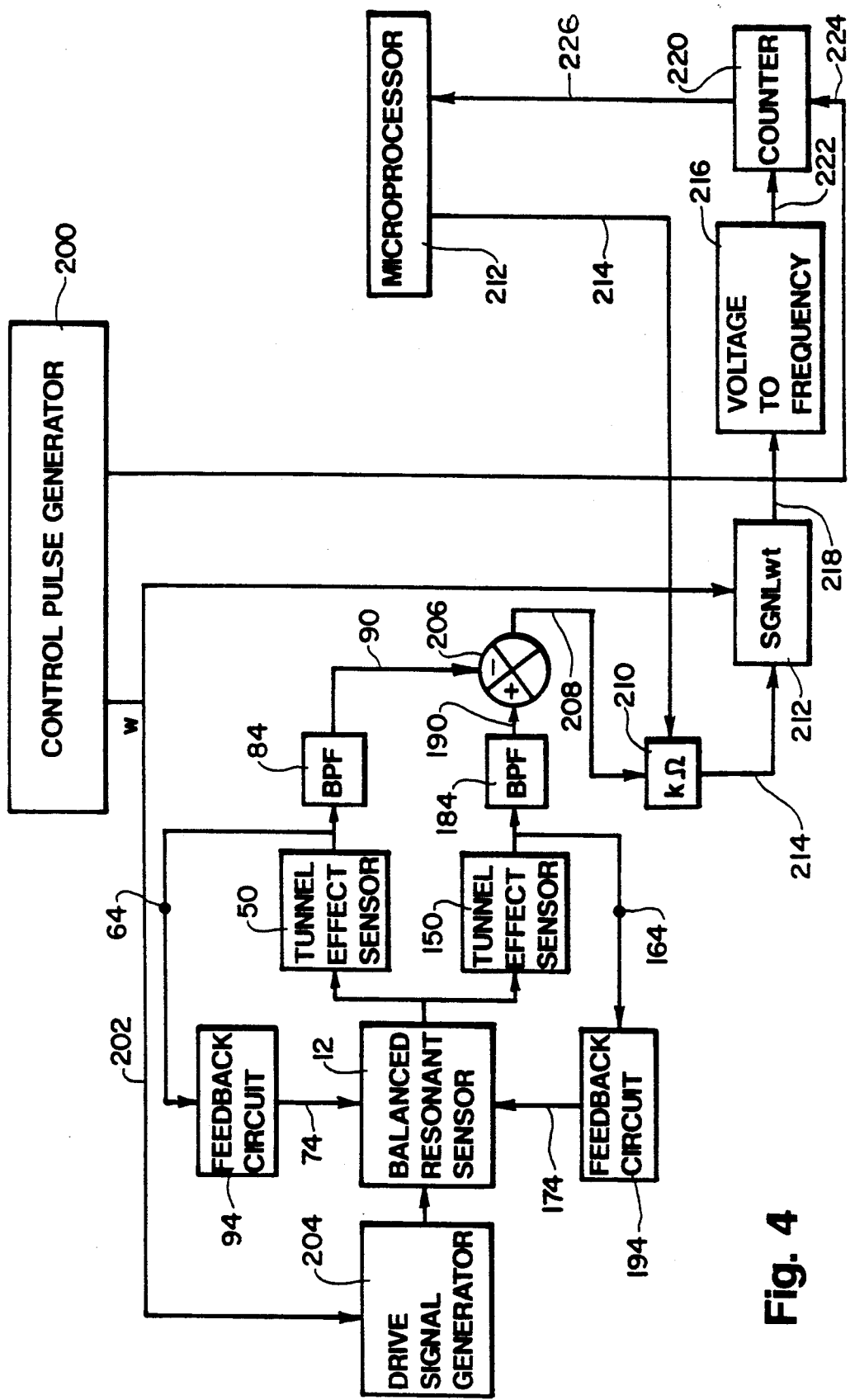
FIG. 4 is a block diagram representation of an angular rate detection system suitable for use in conjunction with the detection arrangement of FIG. 3.

FIG. 4 is a block diagram of a circuit suitable for generating a digital Coriolis signal from the balanced resonant sensing arrangement shown in FIG. 3. The signal represents angular rotation of the sensing element 12 about the longitudinal axis 18. The circuit includes a control pulse generator 200 which generates a series of pulses on a line 202 that is functionally related to the frequency $\omega$ which is utilized as input to a drive signal generator 204. The drive signal generator 204 vibrates the first and second tines of the balanced resonant sensor 12 in an angular direction in the plane of the vibratory tines at a predetermined frequency $\omega$.

The first and second tunnel effect sensing circuits 50, 50 detect the vibrational movement and provide a composite signal to respective feedback circuits 94 and 194 on the lines 64 and 164. The feedback circuits provide compensation signals to the resonant sensor 12 on the lines 74 and 174, respectively. The composite signal is also supplied to the band-pass filter circuits 84 and 184 to provide analog angular rate voltage signals $a_{z1}$ and $a_{z2}$ on the lines 90 and 190, respectively.

The rate signals are supplied via the lines 90 and 190 to a summing junction 206. The output of the summing junction 206 on a line 208 is a signal that is the difference of the angular rate components $(a_{z2} - a_{z1})$ to provide a signal with substantially enhanced angular rate components. This signal is supplied to a scaling amplifier 210, which receives scaling information from a processor 212 via a line 214 as will be understood by those skilled in the art The scaled analog rate signal from the scaling amplifier 210 is applied to a multiplication circuit 212 via a line 214. The multiplication circuit multiplies the rate signal by the zero mean periodic signal sgnc$\omega$t. The output from the circuit 212 is an analog signal having the form $K\Omega$ $(a_{z2} - a_{z1})$ sgnc$\omega$t which contains angular rate information. The multiplication circuit 212 provides the analog signal to a voltage-to-frequency converter circuit 216 on a line 218 and converts the rate information into a frequency signal which is then applied to a digital counter 220 via a line 222. The counter 220 effectively integrates the output of the sign switching circuit 212 by counting the number of cycles of the frequency output on the line 222 over the time period T which may, for example, represent one cycle of the frequency $\omega$.

The counter 220 receives a signal over a line 224 from the control pulse generator representing the same time period T. Accordingly, at the end of every time period T, the counter 220 will output a digital signal via a line 226 that represents the angular rotation of the structure containing the sensing element 12 during the cycle T. This signal is thereafter supplied as an input to the microprocessor 212. This process is further disclosed in U.S. Pat. No. 4,522,062, the subject matter of which is incorporated herein by reference.

Thus, there has been described herein an apparatus and method for detecting Coriolis forces in a system which uses a tunnel effect displacement sensor for generating a Coriolis signal. The system provides for a very sensitive mechanism which is easy to install and flexible in operation. It will be understood by various changes in the details and arrangements of the apparatus and methods that have been described herein in order to explain the nature of the invention may be made by those skilled in the art within the principal and scope of the present invention as expressed in the appended claims.

What is claimed is:

1. An angular rate sensor for deriving a Coriolis acceleration signal comprising:
   Coriolis force sensing means having first and second vibrating tines interconnected with a mounting pad for generating a deflection of said mounting pad in response to an angular rotation of said force sensing means;
   sensing circuit means including tunnel-effect sensing means having a first sensing probe disposed on said mounting pad of said Coriolis force sensing means and a second sensing probe disposed at an average predetermined spaced relation from said first sensing probe for detecting said deflection and generating a sensing signal in response to said deflection;

feedback circuit means coupled with said sensing circuit means for receiving said sensing signal and for providing a feedback signal to said Coriolis force sensing element for maintaining said first and second sensing probes at said average predetermined spaced relation; and output circuit means coupled with said sensing circuit means for receiving said sensing signal and providing an output Coriolis signal indicative of angular rate.

2. The angular rate sensor of claim 1 further comprising:

a reference element having at least a portion disposed in spaced relation from said mounting pad, said second sensing probe located on said reference element.

3. The angular rate sensor of claim 1 wherein said sensing circuit means further comprises:

voltage source means having first and second terminals, said first terminal coupled with said first sensing probe for providing a constant average potential between said first and second sensing probes; and output resistor means coupled with said second voltage source terminal and with said second sensing probe for developing said output signal.

4. The angular rate sensor of claim 2 wherein said sensing circuit means further comprises:

voltage source means having first and second terminals, said first terminal coupled with said first sensing probe for providing a constant average potential between said first and second sensing probes; and output resistor means coupled with said second voltage source terminal and with said second sensing probe for developing said output signal.

5. The angular rate sensor of claim 4 wherein said feedback circuit means further comprises:

a first electrically conductive portion disposed on said mounting pad and coupled with electrical ground;

a servo mechanism including second and third electrically conductive portions, said second conductive portion disposed opposite said longitudinal axis, said third conductive portion disposed opposite said second conductive portion and said longitudinal axis;

low pass filter circuit means for receiving said sensing signal and providing said feedback signal within a selected frequency range; and means for receiving said feedback signal and providing a first compensation signal to said second conductive portion and a second compensation signal to said third conductive portion, said second compensation signal to 180 degrees out of phase with said first compensation signal, said first and second compensation signals providing a compensating electrostatic torque to selected portions of said mounting pad for maintaining said predetermined average spacing between said first and second sensing probes.

6. A rate detection system for deriving a Coriolis acceleration signal comprising:

oscillator circuit means for providing a predetermined frequency signal;

balanced resonant sensing means including first and second tines mechanically connected with a mounting pad, said first and second tines electrically connected with said oscillator circuit means and oscillating at said predetermined frequency;

tunnel-effect sensing means including a first sensing electrode connected to said mounting pad and a second electrode connected to a reference surface, said tunnel-effect sensing means detecting variations in the separation of said first and second electrodes;

output circuit means for generating an output signal having a Coriolis signal component feedback circuit means for receiving said output signal and supplying a low frequency component of said output signal to said balanced resonant sensing means; and demodulation circuit means coupled with said oscillator circuit means and with said output circuit means for receiving said predetermined frequency signal and said output signal and generating an analog Coriolis signal.

7. The system of claim 6 further comprising:

digital conversion means for receiving said analog Coriolis signal, converting said analog signal to a digital signal, and supplying said digital signal to a processor.

8. A system for deriving a Coriolis acceleration signal comprising:

oscillator circuit means for providing a signal having a predetermined frequency of oscillation;

balanced resonant sensing means including first and second tines mechanically connected with a mounting pad, said first and second tines electrically coupled with said oscillator circuit means and oscillating at said predetermined frequency about a longitudinal sensing axis;

first tunnel-effect sensing circuit means including a first sensing electrode connected to said mounting pad opposite said sensing axis and a second sensing electrode connected to a reference surface with a selected spacing from said first electrode, said first tunnel-effect sensing circuit means detecting variations in the separation of said first and second electrodes and providing a first output signal having a Coriolis signal component and a low frequency component;

first feedback circuit means for receiving said low frequency component and providing a first feedback signal to said balanced resonant sensing means;

second tunnel-effect sensing circuit means including a third sensing electrode connected to said mounting pad opposite said first sensing electrode and said sensing axis and a fourth sensing electrode connected said reference surface within a selected spacing from said third sensing electrode, said second tunnel-effect sensing circuit means detecting variations in the separation of said third and fourth sensing electrodes and providing a second output signal having a Coriolis signal component and a low frequency component;

second feedback circuit means for receiving said second output signal and providing a second feedback signal to said balanced resonant sensing means; and output circuit means including summing means for combining said first and second Coriolis signals and for providing an output Coriolis signal indicative of angular rate.

9. The system of claim 8 further comprising:

digital conversion means for receiving said output Coriolis signal, converting said output Coriolis signal to a digital signal, and supplying said digital signal to a processor.

10. A method for detecting Coriolis acceleration using at least one balanced resonant sensor having first and second tines mechanically connected with mounting pad about a longitudinal sensing axis, tunnel-effect sensing circuit means including a first sensing electrode connected to said mounting pad and a second electrode connected to a reference surface, said method including;

inducing said first and second tines into resonance;

detecting variations in the separation of said first and second electrodes and providing a sensing signal having a Coriolis component;

filtering said sensing signal and providing a feedback signal within a selected frequency range;

supplying said feedback signal to said balanced resonant sensor for maintaining the average spacing between said first and second electrodes; and demodulating said sensing signal for generating an analog Coriolis signal.

11. The method of claim 10 further including:

converting said analog Coriolis signal to a digital signal and supplying said digital signal to a processor.

* * * * *